United States Patent Office 3,387,228
Patented June 4, 1968

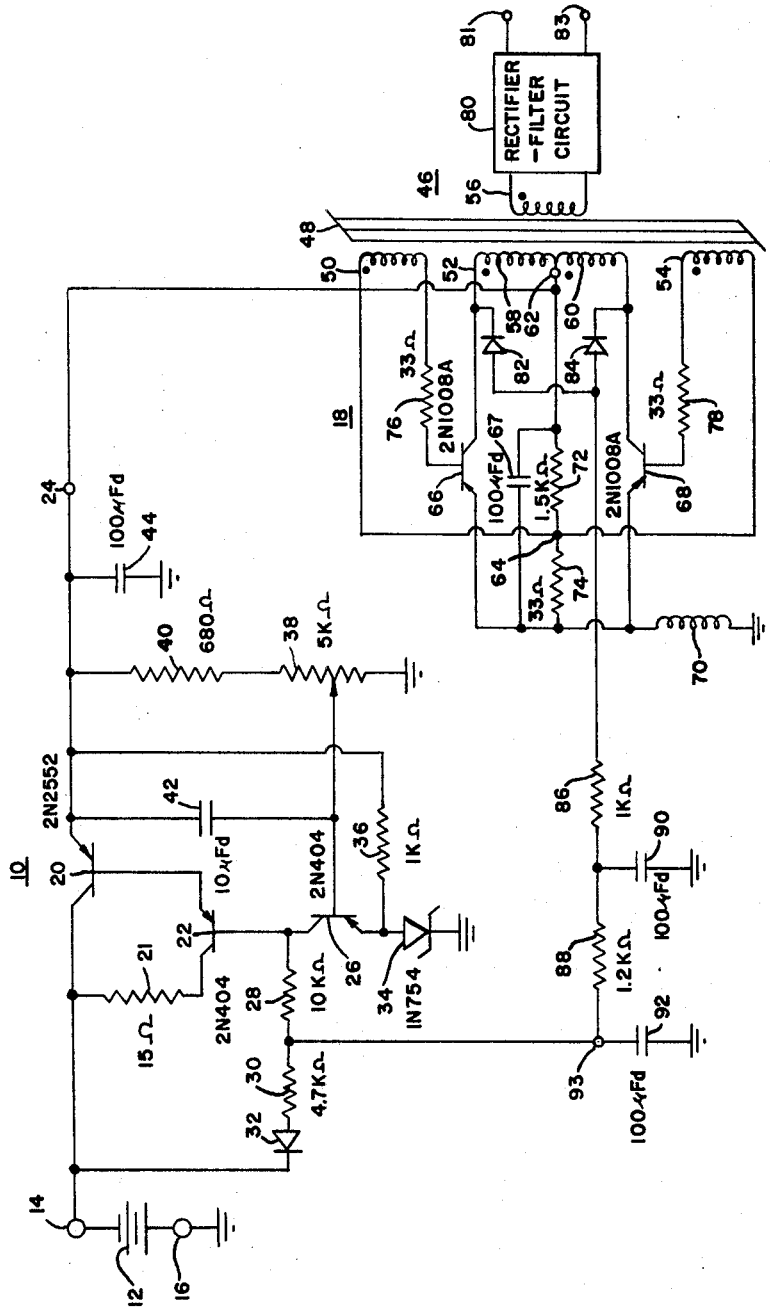

3,387,228
REGULATED INVERTER CIRCUIT
John M. Randall, Fairport, N.Y., assignor to Bausch &
Lomb Incorporated, Rochester, N.Y., a corporation of
New York
Filed Sept. 30, 1965, Ser. No. 491,643
9 Claims. (Cl. 331—113)

ABSTRACT OF THE DISCLOSURE

A regulated inverter circuit is disclosed including a pair of transistors connected in a series circuit with a winding of a transformer and coupled to oscillate when a direct current energization potential is applied thereto. A regulator circuit controls the magnitude of the direct current potential applied to the inverter circuit from a source. The regulator circuit includes a series regulator controlled by a feedback amplifier that is initially energized by the source through a diode. The output potential from the regulator is fed back to the amplifier to maintain the regulator output substantially constant. A rectifier circuit is coupled to the winding included in the series circuit to rectify the signal oscillations in the inverter circuit. The rectifier signals are filtered and applied to the feedback amplifier to reverse bias the diode and provide the energization potential for the amplifier.

This invention relates to power supply circuits in general and more particularly to regulated electrical inverter circuits utilizing oscillator circuits for converting a low direct current potential to a higher alternating current and/or direct current potential.

An oscillator type of inverter circuit generally includes switching or amplifying devices such as transistors connected in a manner to sustain oscillations in response to an applied unidirectional energization potential (such as a direct current power supply voltage). The oscillation signals are stepped-up through transformer action to produce a higher alternating current (A-C) output voltage. This A-C voltage can be rectified and filtered to produce a substantially higher direct current (D-C) potential than that initially applied to energize the inverter circuit.

The frequency and amplitude of oscillations is generally related to the amplitude of the D-C energizing potential applied to the inverter circuit. If a substantially constant frequency or amplitude output voltage is desired, the energizing potential applied to the inverter circuit must be regulated to remain substantially constant.

A particular problem is presented when employing such oscillator inverter circuits in portable battery operated equipment. In order to efficiently operate the regulated inverter circuit in such portable type equipment the regulation circuit must be capable of maintaining the energizing potential applied to the inverter circuit substantially constant for wide variations in battery voltage to compensate for decreased battery potential with use.

It is therefore an object of this invention to provide a new and improved regulated electrical inverter circuit for deriving a substantially constant frequency and amplitude alternating output voltage from a unidirectional input voltage.

It is also an object of this invention to provide a new and improved regulated electrical inverter circuit for deriving a substantially constant frequency and amplitude alternating output voltage from a unidirectional input voltage for wide variations in the input voltage.

It is still a further object of this invention to provide a new and improved regulated electrical inverter circuit for deriving a substantially constant frequency and amplitude alternating output voltage from an energizing unidirectional input voltage that is adaptable to be used with line cord and battery operated portable equipment.

In general, the present invention includes an oscillator circuit that breaks into oscillation upon the energization of the circuit, the amplitude and frequency thereof being a function of the amplitude of the applied energization potential. A regulator circuit is provided for regulating the energization potential applied to the oscillator circuit to provide for a substantially constant frequency and amplitude of oscillation. A rectifier and filter circuit is connected to the oscillator circuit to rectify and filter the oscillation signals to produce a direct current potential. The direct current potential is applied to the regulator circuit so that a portion of the regulator circuit is energized independent of the applied energization potential thereby providing a regulated amplitude and frequency of oscillation from the oscillator circuit for a wider range of variations in the applied energization potential.

Additional objects and advantages of the invention will be apparent from the following description taken in conjunction with the accompanying drawing illustrating a schematic diagram of a regulated inverter circuit embodying the invention.

The regulated inverter circuit includes a regulator circuit 10 connected to regulate the output of a source of unidirectional energization potential, illustrated as a battery 12. The source of energizing potential is connected across a source terminal 14 and a reference terminal 16 (connected to ground). The regulator circuit 10 applies a substantially constant energization potential to an inverter circuit 18 to control the amplitude and frequency of oscillations of the inverter circuit.

The regulator circuit includes a pair of transistors 20 and 22 connected as a controlled series compound connected transistor pair between the supply terminal 14 and a regulator circuit output terminal 24 including a resistor 21 connected between the collector electrodes of the transistor 20 and 22. A third transistor 26 is connected as a control transistor with its collector electrode connected to the supply terminal 14 through resistors 28 and 30 and a diode 32, while its emitter electrode is connected to ground through a Zener diode 34. The collector electrode of the transistor 26 is also connected to the base electrode of the transistor 22 so that the current flow through the transistors 20 and 22 is controlled by the collector current of the transistor 26. The diode 32 is poled for collector current flow between the transistor 26 and the supply terminal 14.

The Zener diode 34 is reversed biased into a Zener breakdown mode of operation by a voltage applied from the output terminal 24 through a resistor 36 to provide a substantially constant reference and biasing voltage for the transistor 26. A feedback voltage is developed across a series voltage divider network connected between the output terminal 24 and ground including a resistor 40 and a potentiometer 38. The variable arm of the potentiometer 38 is connected to the base electrode of the transistor 26 to preset the current flow through the transistor 26 and therefore determine the amplitude of voltage developed between the output terminal 24 and ground. A capacitor 42 is connected between the output terminal 24 and the base electrode of the transistor 26 to speed the response of the regulator circuit for transient voltage variations. A filter capacitor 44 is also connected between the output terminal 24 and ground.

The inverter circuit 18 includes a transformer 46 including a saturable magnetic core 48 and windings 50, 52, 54 and 56 wound about the core 48 to provide an inductive relation between the windings and the core having a polarity as conventionally illustrated by dots. The winding 52 includes two winding portions 58 and 60 with an intermediate terminal 62 connected to one end of the two winding portions 58 and 60. The windings 50 and 54 can be separate windings, as illustrated for sake of clarity, or two winding portions of a single winding, since one end of each of the windings 50 and 54 are connected to a common junction point 64.

The inverter circuit includes two switching devices illustrated as the transistors 66 and 68. The collector electrodes of the transistors 66 and 68 are connected to opposite ends of the winding 52 while the emitter electrodes are connected in common to ground through a R.F. filter coil 70. The regulated energization potential from the output terminal 24 of the regulator circuit 10 is applied to the intermediate terminal 62 so that the current flow through the winding portions 58 and 60 and the connected transistors 66 and 68 produces a magnetic flux of opposing polarity in winding portions 58 and 60.

A biasing circuit including resistors 72 and 74 is connected between the intermediate terminal 62 and the emitter electrodes of the transistors 66 and 68 to develop a biasing voltage at the junction 64. A by-pass capacitor 67 is connected across the resistors 72 and 74. The windings 50 and 54 are connected between the junction point 64 and the base electrodes of the transistors 66 and 68 through current limiting spurious oscillation spoiler resistors 76 and 78 respectively to provide signal and biasing voltages to the respective transistors. The polarity of the windings 50, 52, and 54 are such as to sustain oscillations upon the energization of the circuit.

An output from the inverter circuit is developed across the winding 56. The number of turns in the winding 56 is generally substantially greater than that in the winding 52 to provide for a step-up transformer action but it may be any ratio needed. A rectifier-filter circuit 80 is connected to rectify and filter the alternating voltage developed across the winding 56 to provide a unidirectional output voltage across the terminals 81 and 83 that is substantially greater than the energizing potential applied across the source and reference terminals 14 and 16 and applied to the intermediate terminal 62.

When the inverter circuit 18 is energized the transistors 66 and 68 are rendered alternately conductive and non-conductive (saturated and cut-off) at a frequency determined by the amplitude of the energizing potential and the magnetic characteristics of the saturable core 48. Furthermore, the amplitude of the oscillations is also directly related to the amplitude of the energization potential. If the amplitude of energization voltage applied to the intermediate terminal 62 is allowed to vary, the alternating voltage developed across the winding 56 and the output of the rectifier-filter circuit 80 connected to the winding 56 will undesirably vary as a function of the applied energization potential. If a substantially constant source of high alternating or high direct voltage output is required, the energization potential must be held constant.

As the potential of the power supply 12 decreases the various currents in the regulator circuit 10 change correspondingly to hold the output voltage substantially constant. With the transistor 26 solely energized by the potential applied across the source and reference terminals 14 and 16, the regulator circuit 10 will not provide sufficient regulation action beyond a predetermined level. It was found that the range of regulation can be extended to a substantially lower applied potential and the quality of regulation can be much improved by providing a separate source of energization for the transistor 26.

A separate source of energization 93 is provided which is greater than the source 12 using no extra winding being of obvious advantage in battery operated equipment by a rectifier-filter circuit connected to rectify and filter the oscillation signals generated by the inverter circuit 18. The cathode electrodes of a pair of diodes 82 and 84 are connected to the opposite ends of the winding 52 and the anode electrodes are connected together. The anode electrodes are in turn connected to a filter circuit including the series resistors 86 and 88 and the shunt capacitors 90 and 92. The filtered rectified oscillation signals are applied to the junction of the resistors 30 and 28.

When the transistor 66 is saturated and the transistor 68 is cut off, twice the voltage applied to the intermediate terminal 62 appears at the cathode of the diode 84 and vice versa. The diodes 82 and 84 act as a full wave rectifier. The filtered voltage developed across the capacitor 92 is generally of sufficient amplitude, to reverse bias the diode 32 to cut off the diode and provide the energization potential for the transistor 26.

When the circuit in the drawing is initially energized, the inverter circuit is not oscillatory and no voltage is developed by the rectifier circuit. The entire regulator circuit including the transistor 26 is initially energized by the source 12. The transistors 20 and 22 conduct to apply an energization potential to the inverter circuit 18 thereby causing the inverter circuit to oscillate. When the oscillation signals reach an amplitude wherein the rectified voltage developed across the capacitor 92 approaches that of the source 12 or greater, the diode 32 becomes reversed biased and the transistor 26 is energized by the rectifying circuit. With this sort of operation it was found that the regulator circuit functions at a substantially lower value of applied energization potential 12 thereby providing for a longer effective battery life when employed in portable equipment.

I claim:
1. An electrical circuit comprising:
   a supply point and a reference point adapted to be connected to a source of unidirectional energizing potential;
   first, second, third and fourth transistors, each having base, emitter and collector electrodes;
   a magnetic core including a plurality of windings linking said core in inductive relation, a first one of said plurality of windings having first and second and intermediate terminals;
   circuit means connecting the first transistor emitter and collector electrodes between said supply point and said intermediate terminal;
   circuit means for providing a substantially constant biasing potential;
   a diode;
   circuit means connecting the second transistor collector and emitter electrodes, said diode, and at least a portion of said circuit means for providing a substantially constant biasing potential in a series circuit between said supply point and said reference point;
   circuit means connecting the second transistor collector-emitter series circuit to the first transistor base electrode so that the first transistor collector to emitter current is controlled as a function of the second transistor collector-to-emitter current;
   circuit means connected between said intermediate terminal and the second transistor base electrode for applying a feedback potential thereto so that said second transistor collector-to-emitter current is con- trolled by amplitude of potential developed at said intermediate terminal;

circuit means for connecting the collector and emitter electrodes of said third and fourth transistors in a series circuit between the first and second terminals of said first winding;

circuit means including a biasing circuit connecting a second winding and a third winding of said plurality of windings between the base and emitter electrodes of said third and fourth transistors respectively, said second and third windings having a polarity to cause said circuit including said third and fourth transistors to oscillate in response to an energization potential applied to said intermediate terminal;

a rectifier circuit connected to at least one of said first and second terminals of said first winding for rectifying the oscillation signals appearing at at least said one of said first and second terminals;

a filter circuit connected to said rectifier circuit for filtering said rectified oscillation signals, and circuit means for connecting said filter circuit to said second transistor collector-emitter series circuit so that said potential developed by said rectifier and filter circuits reverse biases said diode thereby rendering said diode non-conductive and providing the energization potential for said second transistor.

2. An electrical circuit as defined in claim 1 wherein said circuit means for providing a substantially constant biasing potential includes a series circuit including a resistor and a Zener diode connected between said intermediate terminal and said reference point wherein said Zener diode provides a substantially constant biasing potential.

3. A regulated inverter circuit comprising:

an inverter circuit including a saturable core having a plurality of windings and a pair of transistors connected to said plurality of windings to sustain oscillation when a unidirection energizing potential is applied to one of said plurality of windings, the amplitude of said oscillations being a function of the amplitude of said unidirectional energizing potential;

a supply point and a reference point adapted to be connected to a source of unidirectional energizing potential;

a regulator circuit connected between said supply point and said reference point for providing a regulated source of unidirectional potential for said inverter circuit, said regulator circuit including a first transistor having its emitter and collector electrodes connected in series between said supply point and an output terminal, circuit means for direct current coupling a control transistor emitter and collector electrodes between the base electrode of said first transistor and said reference point and the base electrode of said control transistor being coupled to said output terminal so that the control transistor controls the current flow through said first transistor as a function of the voltage developed at said output terminal, and including a diode connected between said supply terminal and the collector electrode of said control transistor for applying an energizing potential thereto;

circuit means connecting said output terminal to said one of said plurality of windings for applying a regulated unidirectional potential thereto;

a rectifier circuit including a filter circuit connected to at least one of said pair of transistors for providing a unidirectional energizing potential; and circuit means connecting the filter circuit to the collector electrode of said control transistor so that said unidirectional energizing potential developed by said rectifier voltage reverse biases said regulator circuit diode and provides the energization potential for said control transistor whereby the amplitude of oscillations in said inverter circuit remains substantially constant for wide variations in the source of unidirection energizing potential applied to said supply and reference points.

4. A regulated inverter circuit comprising:

a supply point and a reference point adapted to be connected to a source of unidirectional energizing potential;

a regulating circuit connected between said supply and reference points for energization by said applied source of unidirectional potential and for producing a substantially constant unidirectional potential at an output terminal, said regulating circuit including a first amplifying device connected in a series circuit between said supply point and said output terminal, circuit means connecting a second amplifying device in a shunt circuit with said supply and reference points including a unidirectional current means connected between said supply point and said second amplifying device, circuit means connecting said shunt circuit to said first amplifying device to control the current flow through said first amplifying device and feedback circuit means connecting said output terminal to said second amplifying device so that the potential developed between said output terminal and said reference point is maintained substantially constant;

an inverter circuit including a saturable magnetic core with a plurality of windings in inductive relation with said core, a pair of switch means having effective open and closed operating conditions, a first winding having first, and second terminals being connected in a series circuit with said switch means, control means for controlling the operation of said switch means including at least a second one of said plurality of winding to establish opposing operation thereof so that said inverter circuit oscillates when a unidirectional energizing potential is applied to said series circuit whereby the amplitude of oscillation signals is a function of the amplitude of said energizing potential applied to said series circuit;

circuit means for connecting said output terminal to said series circuit for applying an energizing potential to said inverter circuit;

a rectifying circuit connected to at least one of said pair of switch means for rectifying said oscillation signals;

a filter circuit connected between said rectifying circuit and said reference point for filtering the rectified oscillation signals; and circuit means for connecting the filter circuit to said unidirectional current means whereby said filtered rectified oscillation signals renders said unidirectional current means non-conductive and provides the energization potential for said second amplifying device.

5. An electrical circuit comprising:

a supply point and a reference point adapted to be connected to a source of unidirectional energizing potential;

first, second, third, fourth and fifth transistors each having base emitter and collector electrodes;

circuit means for connecting the collector electrode of said first transistor to said supply point;

circuit means including a variable resistor connecting the emitter electrode of said first transistor to said reference point;

circuit means connecting the collector electrode of said second transistor to said supply point;

circuit means connecting the emitter electrode of said second transistor to the base electrode of said first transistor;

circuit means connecting the collector electrode of said third transistor to the base electrode of said second transistor;

a Zener diode connected between the emitter electrode of said third transistor and said reference point;

resistive means connected between the emitter electrode of said first transistor and the emitter electrode of said third transistor for Zener breakdown of said Zener diode to provide a substantially constant biasing voltage;

circuit means including a diode connected between the collector electrode of said third transistor and said supply point, said diode being poled in a direction to provide for the energization of said third transistor by said source of unidirectional energizing potential applied across said supply and reference terminals;

circuit means for connecting the base electrode of said third transistor to said variable resistor for applying a biasing potential thereto;

a saturable magnetic core including a plurality of winding portions in inductive relation with said core and with each other, said winding portions including at least a pair of terminals;

circuit means connecting the emitter electrode of said first transistor to one of said pairs of terminals of a first and a second winding portion of said plurality of winding portions for applying an energizing potential thereto;

circuit means connecting the collector electrodes of said fourth and fifth transistors to the other of said pair of terminals of said first and second winding portions respectively so that said fourth and fifth transistors are energized through separate paths of opposing directions of magnetization of said core;

circuit means connecting the emitter electrodes of said fourth and fifth transistors to said reference point;

circuit means including a biasing circuit connecting said pair of terminals of a third and fourth winding portions between the emitter and base electrodes of said fourth and fifth transistors respectively whereby said third and fourth winding portions apply voltages induce therein across the base and emitter electrodes of the respective transistors of opposing polarity in a direction to sustain oscillations upon the application of an energizing potential;

a first and a second rectifying device connected to the collector electrode of said fourth and fifth transistors respectively and being poled to rectify the oscillation signals appearing at the collector electrodes of said fourth and fifth transistors;

a filter circuit connected between the rectifying devices and said reference point for filtering the rectified oscillation signals; and circuit means connecting the filter circuit to said diode connected between said supply point and the collector electrode of said third transistor for applying the filtered rectified oscillation signals thereto so that said filtered rectified oscillation signals reverse bias said diode and provide this collector electrode energization potential for said third transistor.

6. An electrical circuit as defined in claim 5 wherein said plurality of winding portions includes a fifth winding portion that is in a step-up relation with said first and second winding portion for developing alternating current output signals at the same frequency as said oscillation signals but at a substantially higher amplitude.

7. An electrical circuit as defined in claim 5 including:
a fifth winding portion on said saturable core including a substantially large number of turns than said first and second winding portions for developing alternating current output signals having an amplitude that is substantially greater than the amplitude of said oscillation signals in said first and second winding portions;

a rectifier circuit connected to said fifth winding portion for rectifying said alternating current output signals, and a filter circuit connected to said rectifier circuit for filtering said rectified alternating current output signals for producing a regulated unidirectional potential that is substantially greater than said unidirectional energization potential applied across said supply and reference points.

8. An electrical circuit comprising:
a supply point and a reference point adapted to be connected to a source of unidirectional energizing potential;

a transformer including a plurality of windings;

a pair of switching means having effective open and closed operating conditions;

circuit means connecting said pair of switching means in a series circuit with a first winding of said transformer;

circuit means connecting said pair of switching means to a second winding and a third winding of said transformer so that the circuit including the first, second and third windings and said pair of switching means oscillates when a unidirectional potential is applied to said series circuit;

first and second amplifying devices, each including first and second electrodes with a controllable current path therebetween and including a control electrode for controlling the current flow through said current path;

circuit means for connecting the first and second electrodes of said first amplifying device between said supply point and said series circuit for applying a unidirectional energization potential thereto;

circuit means including a unidirectional current means for connecting one of said first and second electrodes of said second amplifying device to said supply point;

circuit means including a biasing means connecting the other of said first and second electrodes of said second amplifying device to said reference point;

circuit means for connecting the control electrode of said second amplifying device to one of the first and second electrodes of said first amplifying device other than that connected to said supply point, for applying a feedback signal to control the current flow through the second amplifying device current path;

circuit means for connecting said one of said first and second electrode of said second amplifying device connected to said supply point to the control electrode of said first amplifying device so that said first and second amplifying devices cooperate to apply a regulated energization potential to said series circuit;

a rectifier circuit connected to said series circuit to rectify the oscillation signals;

a filter circuit connected to said rectifier circuit for filtering said rectified oscillation signals, and circuit means for connecting said filter circuit to said unidirectional current means so that the rectified and filtered oscillation signals have a polarity to render said unidirectional current means non-conductive and provide an energization potential for said second amplifying device.

9. An electrical circuit comprising:
a supply point and a reference point for connection to a source of unidirectional energizing potential;

an inverter circuit generating an oscillating signal having an amplitude responsive to the magnitude of a direct current energizing potential applied thereto;

first and second amplifying devices each having first and second electrodes and a control electrode for controlling the current flow therebetween;

circuit means connecting the first electrode of said first amplifying device to said source point;

circuit means connecting the second electrode of said first amplifying device to said inverter circuit for applying an energizing potential thereto;

circuit means connecting the second electrode of said second amplifying device to said reference point;

circuit means connecting the first electrode of said second amplifying device to the control electrode of said first amplifying device so that the second amplifying device controls the current flow through the first amplifying device;

circuit means for connecting the second electrode of said first amplifying device to the control electrode of said second amplifying device to apply a feedback voltage thereto;

a rectifier circuit coupled to said inverter circuit to rectify the oscillation signals developed by said inverter circuit;

a filter circuit coupled to said rectifier circuit for filtering the rectified signals, and circuit means connecting said filter circuit and said source point to said first electrode of said second amplifying device so that said second amplifying device is initially energized by said source when an energizing potential is first applied to the source and reference points and is subsequently energized by said filtered rectified signals when said inverter circuit oscillates.

References Cited

UNITED STATES PATENTS

| | | | |
|---|---|---|---|
| 3,119,056 | 1/1964 | Hatke et al. | 331—113 |
| 3,327,199 | 6/1967 | Gardner et al. | 321—2 |

JOHN KOMINSKI, *Primary Examiner.*